United States Patent [19]

Yokoyama et al.

[11] 4,267,080

[45] May 12, 1981

[54] POLYETHYLENE COMPOSITION FOR ROTATIONAL MOLDING

[75] Inventors: Takayuki Yokoyama, Tokyo; Yoshiaki Nakayama, Moriyama; Yasuo Yasuda, Kawasaki, all of Japan

[73] Assignee: Asahi Kasei Kogyo Kabushiki Kaisha, Osaka, Japan

[21] Appl. No.: 79,743

[22] Filed: Sep. 28, 1979

[30] Foreign Application Priority Data

Oct. 19, 1978 [JP] Japan .................................. 53-127819

[51] Int. Cl.$^3$ ...................... C08L 23/06; C08L 23/08; C08L 23/28
[52] U.S. Cl. .................................. 260/4 R; 264/310; 264/331.13; 525/98; 525/193; 525/194; 525/211; 525/215; 525/232; 525/240
[58] Field of Search ............... 525/194, 211, 240, 193, 525/98, 215, 232; 260/4 R; 264/310, 331

[56] References Cited

U.S. PATENT DOCUMENTS

| 2,832,748 | 4/1958 | Safford et al. | 525/194 |
| 3,184,522 | 5/1965 | Zagar | 525/194 |
| 3,256,366 | 6/1966 | Corbelli | 525/240 |
| 3,784,668 | 1/1974 | Neidinger | 264/310 |
| 4,029,729 | 6/1977 | Rees et al. | 264/310 |
| 4,032,600 | 6/1977 | MacAdams et al. | 525/211 |
| 4,088,714 | 5/1978 | Huff | 525/194 |

*Primary Examiner*—Carman J. Seccuro
*Attorney, Agent, or Firm*—Sprung, Felfe, Horn, Lynch & Kramer

[57] ABSTRACT

Polymers of ethylene having incorporated therein (1) 5-50 weight parts of a rubber and/or an elastomer based on 100 weight parts of the ethylene polymers, (2) a crosslinking agent selected from bis(tert. alkylperoxy)alkane or bis(tert. alkylperoxy)benzene, and (3) 0.5-5 times by weight the amount of the crosslinking agent, of at least one cross-linking aid selected from 1,2-polybutadiene, triallyl cyanurate and triallyl isocyanurate, are rotationally molded to produce molded articles possessing good release characteristics as well as high impact strength and enhanced surface luster.

9 Claims, No Drawings

POLYETHYLENE COMPOSITION FOR ROTATIONAL MOLDING

BACKGROUND OF THE INVENTION

1. Field of the Invention

This invention relates to a polyethylene composition useful in rotational molding. The rotationally molded articles therefrom are characterized as exhibiting enhanced impact strength, luster and mold-release characteristics.

2. Description of the Prior Art

Rotational molding is effected by supplying to a mold a powdered thermoplastic material and rotating the mold uniaxially or biaxially while externally heating the mold to fuse the thermoplastic powder and then cooling the mold to cause the molded article to solidify. Rotational molding has a feature such that it can result in hollow articles which are, as compared with those obtained by blow molding methods, complicated, large in size and uniform in wall thickness, and further the material loss is minor. However, rotational molding has the following defects and therefore, rotationally molded articles are limited in their applications.

(1) A powdered thermoplastic material is heated through the wall thickness of a mold to be thereby fused. Accordingly, a substantially long period of heating and a high heating temperature are necessary.

(2) In a step of rotational molding, a fused thermoplastic material flows and spreads to form a fused thermoplastic layer on the inner surface of a mold. Therefore, if the thermoplastic material used is poor in flow characteristics, bubbles are liable to enter the fused thermoplastic layer and the surface of the fused thermoplastic layer becomes roughened, and consequently, the resulting molded articles are not of an attractive appearance.

(3) If a thermoplastic material of enhanced flow characteristics, i.e., having a low molecular weight, is used, the resulting molded articles will be poor in impact strength and environmental stress cracking resistance (ESCR), and thus, in service life.

(4) A thermoplastic material is not subject to pressing during rotational molding. Therefore, the dimension of the resulting molded articles varies depending upon the time at which they are demolded from the mold in the solidifying stage. If the molded articles are demolded early, they shrink to an appreciable extent and thus are distorted.

(5) A molding apparatus is difficult to automatically operate. Both the opening and closing of the mold and demolding of the molded articles must be manually operated.

In order to obtain good molding characteristics to produce well formed rotationally molded articles, it is generally desired to use thermoplastic materials exhibiting a high fluidity, good release characteristics, a high impact strength and a low shrinkage. However, the higher the fluidity, generally the lower the impact strength. No ethylene polymers have hitherto been known to possess satisfactory fluidity and impact strength.

It has been proposed to use a high fluidity polyethylene having an organic peroxide crosslinking agent incorporated therein. For example, U.S. Pat. No. 4,029,729 teaches that a polyethylene composition comprised of an ethylene homopolymer or copolymer possessing a melt index of at least about 10 and having incorporated therein a crosslinking acetylenic diperoxy compound results in rotationally molded articles having a high impact strength and resistance to stress cracking. However, the use of an organic peroxide crosslinking agent has the following difficulties. First, as crosslinking advances, its adhesion to the mold increases, and hence, the resulting solidified molded article cannot be demolded from the mold without the use of release agents such as silicone and fluorocarbon polymers. The use of such release agents causes the following troubles. When the release agents are applied to the mold by a spray coating method, the releasability greatly varies depending upon the amount of the release agents applied and the number of molding shots after the spray thereof, and furthermore, the molded articles are poor in luster. Accordingly, the molded articles are not suitable for the applications where importance is set on their appearance and precision of dimension. When the release agents are applied to the mold by a coating and baking method, the baked release agent coat tends to be partially separated from the mold thereby influencing the releasability and the luster of the molded articles. Moreover, it requires substantial time and labor to restore the partially separated release agent coat, i.e., to scrape down the coat from the mold and again coat and bake the release agent on the mold.

The second difficulty encountered in the method wherein an organic peroxide-incorporated high fluidity polyethylene is used, is that the organic peroxide decomposes to produce low molecular weight radicals which take hydrogen from the polyethylene to form low boiling point substances. Such low boiling point substances cause bubble formation in the molded articles and emit an offensive odor.

In order to avoid the bubble formation, it has also been proposed in Japanese Patent Publication No. 18,296/1979 to use an ethylene polymer composition comprised of an ethylene polymer having incorporated therein an acetylenically unsaturated peroxy compound and a diolefin polymer. The crosslinking acetylenically unsaturated peroxy compound decomposes to produce low molecular weight radicals, but these radicals react on the diolefin polymer to form high molecular weight radicals which do not cause bubble formation in the molded articles. However, this proposed method still has the difficulties that the use of a release agent is unavoidable, the molded articles are poor in luster, and an offensive odor is emitted which irritates the eyes of an operator when the molded articles are demolded.

It has now been found by the inventors of the present invention that a polyethylene composition comprised of polyethylene having incorporated therein a combination of certain crosslinking agent and crosslinking aid results in rotationally molded articles which are demoldable without use of a release agent and exhibits good luster. However, if this polyethylene composition is rotationally molded at a sufficiently high temperature for providing a molded article exhibiting an enhanced degree of crosslinking and thus a satisfactory impact resistance, gases generated by the crosslinking reaction migrate to the interface between the mold surface and the fused polyethylene layer, thereby causing a plurality of depressions (hereinafter referred to as "craters") on the surface of the fused polyethylene. Furthermore, the pressure of gases present in the craters causes cracks in the areas adjacent to the craters on the surface of the crosslinked, fused polyethylene due to the fact that the crosslinked, fused polyethylene has little or no elongation. Thus, it is difficult to enhance the impact resistance without affecting the appearance.

SUMMARY OF THE INVENTION

The main object of the present invention is to provide a polyethylene composition having an organic crosslinking agent incorporated therein, which sticks well to the mold surface during the fusing stage, and therefore suppresses the formation of craters and cracks on the surface of the crosslinked polyethylene. Furthermore, the molded articles can readily be separated from the mold. Therefore, the molded articles possess high impact strength as well as enhanced luster.

The polyethylene composition of the present invention for rotational molding comprises an ethylene polymer having incorporated therein, based on 100 parts by weight of the ethylene polymer, 5 to 50 parts by weight of a rubber and/or an elastomer, a crosslinking amount of the compound expresses by the general formula (1) or (2), indicated below, and 0.5 to 5 times the amount of the crosslinking agent, of at least one crosslinking aid selected from the group consisting of 1,2-polybutadiene, triallyl cyannurate and triallyl isocyannurate.

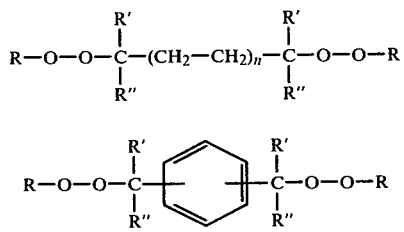

wherein n is an integer of 1 or 2, R is a tertiary alkyl group, and each of R' and R" is an alkyl group.

DESCRIPTION OF THE PREFERRED EMBODIMENT

The ethylene polymer used may be either a polyethylene such as high density, medium density or low density polyethylene, or an ethylene copolymer comprised of at least 85% by weight of ethylene and not more than 15% by weight of a copolymerizable monoethylenically unsaturated monomer such as, for example, ethyl acrylate, vinyl acetate, butadiene and maleic anhydride. The ethylene polymers may be used alone or in combination. The ethylene polymers should be of a high fluidity, i.e., possess a melt index (as determined according to ASTM D-1238, condition E: hereinafter referred to as "MI" for brevity) of at least 5 g/10 min., preferably from 10 to 30 g/10 min.

The rubber and/or the elastomer used in the invention includes, for example, rubbers such as natural rubber (NR), styrene-butadiene rubber (SBR), butadiene rubber (BR), acrylonitrile-butadiene rubber (NBR), chloroprene rubber (CR), isoprene rubber (IR), and isobutylene isoprene rubber (IIR), and elastomers such as chlorinated polyethylene, styrene-butadiene block-copolymer, styrene-isoprene block-copolymer and an ethylene-α-olefin copolymer elastomer. The ethylene-α-olefin copolymer elastomer includes, for example, ethylene-propylene-diene terpolymer (EPDM) and copolymers of ethylene and an α-olefin having 3 to 8 carbon atoms such as ethylene-propylene copolymer rubber (EPR). Of these rubbers and elastomers, the ethylene-α-olefin copolymer elastomer is preferable for the following reasons. First, the ethylene-α-olefin copolymer elastomer enhances the adhesion of the fused ethylene polymer composition to the mold surface, as well as the elongation of the fused ethylene polymer composition, and consequently, even when the ethylene polymer composition is rotationally molded at a sufficiently high temperature and for a sufficiently long time for achieving the desired degree of crosslinking, no craters are formed on the fused material. Secondly, the ethylene-α-olefin copolymer elastomer enhances the release characteristics of the molded articles. Thirdly, the copolymer elastomer is in a form dissimilar to the other rubbers, i.e., not in a block form, and hence, easy to handle.

The amount of the rubber or the elastomer is in the range of from 5 to 50 parts by weight, preferably from 10 to 30 parts by weight, based on 100 parts by weight of the ethylene polymer. When the amount of the rubber or the elastomer is less than about 5 parts by weight, craters are liable to be formed during rotational molding and furthermore the molded articles are poor in impact resistance. In contrast, when the amount of the rubber or the elastomer exceeds about 50 parts by weight, the fused ethylene polymer composition sticks to the mold surface to an undue extent, requiring the use of a release agent for the separation of the molded article from the mold.

The crosslinking agents used in the invention are bis(tert.alkylperoxy) alkanes represented by the formula (1) and bis(tert.alkylperoxy) benzenes represented by the formula (2).

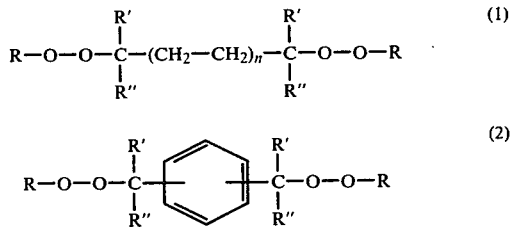

In the above formula, n is an integer of 1 or 2, R is a tertiary alkyl group, preferably a tertiary alkyl group having 4 to 8 carbon atoms, for example, a tertiary butyl or tertiary amyl group, and R' and R" are alkyl groups, preferably alkyl groups having 1 to 8 carbon atoms and may be the same as or different from each other. Illustrations of the bis(tert.alkylperoxy) alkanes are 2,5-bis(-tert.amylperoxy)-2,5-dimethylhexane, 2,5-bis(tert.butylperoxy)-2,5-dimethylhexane, 3,6-bis(tert.butylperoxy)-3,6-dimethyloctane, 2,7-bis(tert.butylperoxy)-2,7-dimethyloctane and 8,11-bis(tert.butylperoxy)-8,11-dimethyloctadecane. Illustrations of the bis(tert.alkylperoxy) benzenes are α,α'-bis(tert.butylperoxy-isopropyl)-benzene and α,α'-bis(tert.amylperoxy-isopropyl)-benzene. Of these crosslinking agents, 2,5-bis(tert.butylperoxy)-2,5-dimethylhexane and α,α'-bis(tert.butylperoxy-isopropyl) benzene are optimum.

The amount of the crosslinking agent to be blended with the ethylene polymer may very depending upon the desired degree of crosslinking, the activity of the crosslinking agent used, the crosslinking aid used and the crosslinking conditions. Usually, the amount of the crosslinking agent is in the range of from 0.1 to 5 parts by weight, preferably from 0.5 to 3 parts by weight, based on 100 parts by weight of the ethylene polymer.

The crosslinking aid used in the invention is selected from 1,2-polybutadiene, triallyl cyanurate and triallyl isocyanurate. Of these, 1,2-polybutadiene is most preferable in view of its function of suppressing the bubble formation and enhancing the release characteristics.

As crosslinking aids to be incorporated in a crosslinking polyethylene composition, many compounds are already known, which include, for example, a trifunctional or more polyallylester of an aromatic polycarboxylic acid, a polyhydric (trihydric or more) alcohol, a polyhydroxybenzene, an acrylic or methacrylic acid ester such as trimethylolpropanetriacrylate, 1,2,3-propanetriolacrylate, trimethylolpropanetrimethacrylate and trimethylolethanetrimethacrylate, trihydroxyalky isocyanurate, triallyl cyanurate, triallyl isocyanurate, triallyl phosphate and 1,2-polybutadiene. Among these crosslinking aids, only triallyl cyanurate, triallyl isocyanurate and 1,2-polybutadiene have a function of suppressing the bubble formation during rotational molding and enhancing the release characteristics when used in combination with the crosslinking agent used in the invention. The 1,2-polybutadiene used in the invention has a number average molecular weight of from 500 to 20,000 and is such that at least 50% of the butadiene units in the polymer chain are of an 1,2-bond. The 1,2-polybutadiene may be either unmodified, or modified, e.g., hydroxyl or carboxyl terminated.

The amount of the crosslinking aid used is in the range of from 0.5 to 5 times by weight, preferably from 1 to 3 times by weight, the amount of the crosslinking agent. When the amount of the crosslinking aid is less than the above-mentioned lower limit, substantially the entire amount of low molecular weight radicals produced by the crosslinking reaction is not caught by the crosslinking aid. That is, bubbles are more or less, produced. When the amount of the crosslinking aid exceeds the above-mentioned upper limit, the ethylene polymer composition becomes poor in thermal resistance and thus, is colored to some extent due to the exposure to the rotational molding temperature.

The ethylene polymer composition of the invention may have incorporated therein suitable amounts of other additives such as stabilizers, weathering agents and coloring materials, which are conventionally used in ethylene polymer compositions for use in rotational molding. If desired, a release agent may also be incorporated therein in an amount such that the release agent does not cause the troubles hereinbefore mentioned. The rotational molding of the ethylene polymer composition of the invention may be carried out using conventional methods.

The invention will be further illustrated by the following examples and comparative examples, wherein parts are by weight and Izod impact strengths were determined according to ASTM D-256.

EXAMPLE 1

A hundred parts of high density polyethylene (M.I.=20 g/10 min.: trade name "Suntec J-310 P" supplied by Asahi Chemical Industry Corp. Ltd.), 20 parts of an ethylene-butene-1 copolymer elastomer (M.I.=4 g/10 min., density=0.88 g/cm$^3$: trade name "Tuffmer A-4085" supplied by Mitsui Petrochemical Co.), 1.5 parts of 1,2-polybutadiene (crosslinking aid: trade name "Nisso PB B-1000" supplied by Nippon Soda Co.) and a crosslinking agent, the name of which and its amount are indicated in Table I, below, were blended together by using a Henschel mixer. The blended product was kneaded at a temperature of 146° to 148° C. by using an extruder. The kneaded product was pulverized into powder by using a pulverizer (model "PP-8" supplied by Pallman Co.). Four hundred and fifty grams of the powder were placed in a generally rectangular mold 200 mm by 200 mm by 100 mm, and the mold was fitted to a McNeil rotational molding machine. The powder was rotationally molded at a temperature of 200° C. for 20 minutes. Then, the mold was cooled by blowing air thereagainst for 15 minutes, then spraying water for 3 minutes and again blowing air thereagainst for 2 minutes. The molded article so obtained exhibited the release characteristics and the physical properties, indicated in Table I. below.

TABLE I

| | High Density polyethylene (wt. parts) | Ethylene-Butene-1 Copolymer Elastomer (wt. parts) | Crosslinking Agent (wt. parts) | | 1,2-polybutadiene | Release Characteristics | Bubble Formation | Luster | Izod Impact Strength(kg-cm/cm) | |
|---|---|---|---|---|---|---|---|---|---|---|
| | | | | | | | | | 20° C. | −30° C. |
| Examples | 100 | 20 | 2,5-Bis(tert.butyl-peroxy)-2,5-dimethylhexane | 0.8 | 1.5 | Good | Not formed | Good | Not broken | Not broken |
| | | | | 1.2 | 1.5 | " | Not formed | " | Not broken | Not broken |
| | | | α,α'-Bis(tert.butyl-peroxy-isopropyl) benzene | 0.8 | 1.5 | " | Not formed | " | Not broken | Not broken |
| | 100 | 20 | | 1.2 | 1.5 | " | Not formed | " | Not broken | Not broken |
| Compa-** rative Example | 100 | 20 | 2,5-Bis(tert.butyl-peroxy)-2,5-dimethyl-hexyne-3 | 0.8 | 1.5 | Non releasable | Not formed | Poor | * | * |
| | | | | 1.2 | 1.5 | Non releasable | Not formed | " | * | * |

*Impossible to measure the Izod impact strength because of non-releasability from the mold.
**When demolded, an offensive odor was emitted and the eyes were irritated

EXAMPLE 2

Rotational molding was carried out in a manner similar to that mentioned in Example 1, wherein 100 parts of high density polyethylene (Suntec J-310 P), 20 parts of an ethylene-butene-1 copolymer elastomer (Tuffmer A-4085), 1.2 parts of 2,5-bis(tert.butylperoxy)-2,5-dimethylhexane (crosslinking agent: trade name "Perhexa 2.5B" supplied by Nihon Yushi Co.) and a crosslinking aid, the name of which and its amount are indicated in Table II, below, were used. The results are shown in Table II, below.

an ethylene-butene-1 copolymer elastomer (Tuffmer A-4085), 0.8 part of 2,5-bis(tert.butylperoxy)-2,5-dime-

TABLE II

| | High Density polyethylene (wt. parts) | Ethylene-Butene-1 Copolymer Elastomer (wt. parts) | Crosslinking Agent** (wt. parts) | Crosslinking Agent Aid | (wt. parts) | Release Characteristics | Bubble Formation | Luster | Izod Impact Strength(kg-cm/cm) | |
|---|---|---|---|---|---|---|---|---|---|---|
| | | | | | | | | | 20° C. | −30° C. |
| Examples | 100 | 20 | 1.2 | 1,2-polybutadiene | 1.2 | Good | Not formed | Good | Not broken | Not broken |
| | | | | | 3.0 | " | Not formed | " | Not broken | Not broken |
| | 100 | 20 | 1.2 | Triallyl cyanurate | 1.2 | " | Not formed | " | Not broken | Not broken |
| | | | | | 3.0 | " | Not formed | " | Not broken | Not broken |
| Comparative Examples | 100 | 20 | 1.2 | tetraallyloxyethane | 1.2 | Non releasable | Formed to great extents | Poor | * | |
| | | | | | 3.0 | Non releasable | Formed to great extents | " | * | |
| | 100 | 20 | 1.2 | Ethylene glycol dimethacrylate | 1.2 | Non releasable | Formed | " | * | |
| | | | | | 3.0 | Non releasable | Formed to some extents | " | * | |
| | 100 | 20 | 1.2 | phenyl-maleiimide | 1.2 | Non releasable | Formed to great extents | " | * | |
| | | | | | 3.0 | Non releasable | Formed to great extents | " | * | |
| | 100 | 20 | 1.2 | Lauryl methacrylate | 1.2 | Non releasable | Formed to great extents | " | * | |
| | | | | | 3.0 | Non releasable | Formed to great extents | " | * | |
| | 100 | 20 | 1.2 | Trimethylol propane triacrylate | 1.2 | Non releasable | Formed to great extents | " | * | |
| | | | | | 3.0 | Non releasable | Formed to great extents | " | * | |

*Impossible to measure the Izod impact strength because of non-releasability from the mold
**2,5-Bis(tert.butylperoxy)-2,5-dimethylhexane

EXAMPLE 3

Rotational molding was carried out in a manner similar to that mentioned in Example 1, wherein 100 parts of high density polyethylene (Suntec J-310P), 20 parts of an ethylene-butene-1 copolymer elastomer (Tuffmer A-4085), 0.8 part of 2,5-bis(tert.butylperoxy)-2,5-dimethylhexane (Perhexa 2.5B) and 1,2-polybutadiene (Nisso PB B-1000), the amount of which is indicated in Table III, below, were used. The results are shown in Table III, below.

TABLE III

| | High Density polyethylene (wt. parts) | Ethylene-Butene-1 Copolymer Elastomer (wt. parts) | Crosslinking Agent*** (wt. parts) | 1,2-polybutadiene (wt. parts) | Release Characteristics | Bubble Formation | Appearance ** | Izod Impact Strength (Kg-cm/cm) | |
|---|---|---|---|---|---|---|---|---|---|
| | | | | | | | | 20° C. | −30° C. |
| Comparative Example | 100 | 20 | 0.8 | 0 | Good | Formed to great extents | C (Bubbles formed) | *Not broken or more than 10 | *3–15 |
| Examples | 100 | 20 | 0.8 | 0.4 | " | Formed to some extents | A-B (Bubbles formed) | Not broken | Not broken |
| | 100 | 20 | 0.8 | 0.8 | " | Not formed | A | Not broken | Not broken |
| | 100 | 20 | 0.8 | 1.5 | " | Not formed | A | Not broken | Not broken |
| | 100 | 20 | 0.8 | 4 | " | Not formed | A | Not broken | Not broken |
| Comparative Example | 100 | 20 | 0.8 | 10 | " | Not formed | B (changed to yellow) | Not broken | Not broken |
| | 100 | 20 | 1.2 | 0.6 | " | Formed to some extents | A-B (Bubbles formed) | Not broken | Not broken |

TABLE III-continued

|  | High Density polyethylene (wt. parts) | Ethylene-Butene-1 Copolymer Elastomer (wt. parts) | Cross-linking Agent*** (wt. parts) | 1,2-poly-butadiene (wt. parts) | Release Characteristics | Bubble Formation | Appearance ** | Izod Impact Strength (Kg-cm/cm) 20° C. | Izod Impact Strength (Kg-cm/cm) −30° C. |
|---|---|---|---|---|---|---|---|---|---|
| Examples | 100 | 20 | 1.2 | 1.2 | " | Not formed | A | Not broken | Not broken |
|  | 100 | 20 | 1.2 | 6 | " | Not formed | A | Not broken | Not broken |
| Comparative Example | 100 | 20 | 1.2 | 10 | " | Not formed | B (changed to yellow) | Not broken | Not broken |

*The molded articles had bubbles formed therein, and hence, their Izod impact strengths were not even among the molded articles.
**A: Excellent, B: Good, C: Poor
***2,5-(Bis(tert. butylperoxy)-2,5-dimethylhexane

EXAMPLE 4

A hundred parts of high density polyethylene (Suntec J-310P), an ethylene-butene-1 copolymer elastomer (Tuffmer A-4085) or a styrene-butadiene copolymer elastomer (trade name "Tuffprene" supplied by Asahi Chemical Industry Corp. Ltd.) (the amount of which is indicated in Table IV, below), 0.8 part of 2,5-bis(tert-.butylperoxy)-2,5-dimethylhexane (Perhexa 2.5B) and 1.0 part of 1,2-polybutadiene (Nisso PB B-1000) were blended, kneaded, and then pulverized in a manner similar to that mentioned in Example 1. 1.7 Kg of the powder so obtained was placed in a 9 liter volume mold and then subjected to rotational molding in a manner similar to that mentioned in Example 1. The molding conditions were varied as shown in Table IV, below. The results are shown in Table IV, below. The hammer impact resistance was tested by striking each molded article specimen with full power by using a 5.5 kg hammer at temperatures of 20° C. and −30° C.

TABLE IV

|  | Composition | | | | | | | | | |
|---|---|---|---|---|---|---|---|---|---|---|
|  | High Density polyethylene (wt. parts) | Elastomer*** (wt. parts) | Cross-linking Agent (wt. parts) | 1,2-poly-butadiene (wt. parts) | Heating conditions temp. (°C.) × time(min) | Release characteristics | Luster | Formation of craters and cracks | Izod Impact Strength kg-cm/cm (at −30° C.) | Hammer Impact Resistance 20° C. | Hammer Impact Resistance −30° C. |
| Comparative Example | 100 | A 0 | 0.8 | 1.0 | 215 × 20 | Good | Good | Not formed | 5.2 | Cracks formed when struck twice | Broken into fine pieces when struck once |
|  | 100 | A 0 | 0.8 | 1.0 | 230 × 20 | " | " | Conspicuously | 6.5 | Cracks formed when struck three times | Cracks formed when struck once |
|  | 100 | A 5 | 0.8 | 1.0 | 215 × 20 | " | " | Not formed | 8.6 | Cracks formed when struck five times | Cracks formed when struck once |
|  | 100 | A 10 | 0.8 | 1.0 | 215 × 20 | " | " | Not formed | Not broken | No cracks formed when struck five times | Cracks formed when struck twice |
|  | 100 | A 10 | 0.8 | 1.0 | 230 × 20 | " | " | Not formed | " | No cracks formed when struck five times | Cracks formed when struck twice |
| Example | 100 | A 20 | 0.8 | 1.0 | 215 × 20 | " | " | Not formed | " | No cracks formed when struck five times | No cracks formed when struck five times |
|  | 100 | A 20 | 0.8 | 1.0 | 230 × 20 | " | " | Not formed | " | No cracks formed when struck five times | No cracks formed when struck five times |
|  | 100 | A 20 | 0.8 | 1.0 | 250 × 20 | " | " | Not formed | " | No cracks formed when struck five times | No cracks formed when struck five times |
|  | 100 | A 30 | 0.8 | 1.0 | 230 × 20 | " | " | Not formed | " | No cracks formed when struck five times (Greatly distorted) | No cracks formed when struck five times |
| Examples | 100 | A 50 | 0.8 | 1.0 | 230 × 20 | ** | Uneven | Not formed | Not Broken | No cracks formed when struck five times | No cracks formed when struck five times |

TABLE IV-continued

| | Composition | | | | | | | | Hammer Impact Resistance | |
|---|---|---|---|---|---|---|---|---|---|---|
| | High Density poly-ethylene (wt. parts) | Elasto-mer*** (wt. parts) | Cross-linking Agent* (wt. parts) | 1,2-poly-butadi-ene (wt. parts) | Heating condi-tions temp. (°C.) × time(min) | Re-lease char-acter-istics | Luster | Forma-tion of craters and cracks | Izod Impact Strength kg-cm/cm (at −30° C.) | 20° C. | −30° C. |
| Compar-ative Example | 100 | A 100 | 0.8 | 1.0 | 230 × 20 | Non-releas-able | Poor | Not formed | " | (Greatly distorted) No cracks formed when struck five times | (Greatly distorted) No cracks formed when struck five times |
| Example | 100 | B 5 | 0.8 | 1.0 | 215 × 20 | Good | Good | Not formed | 6.8 | (Greatly distorted) Cracks formed when struck three times | (Greatly distorted) Cracks formed when struck once |
| | 100 | B 20 | 0.8 | 1.0 | 230 × 20 | Good | Good | Not formed | Not broken | No cracks formed when struck five times | Cracks formed when struck twice |
| | 100 | B 50 | 0.8 | 1.0 | 230 × 20 | ** | Un-even | Not formed | " | No cracks formed when struck five times | No cracks formed when struck five times |
| Compar-ative Example | 100 | B 100 | 0.8 | 1.0 | 230 × 20 | Non-releas-able | Poor | Not formed | Not broken | (Greatly distorted) No cracks formed when struck five times (Greatly distorted) | (Greatly distorted) No cracks formed when struck five times (Greatly distorted) |

*2,5-Bis(Tert. Butylperoxy)-2,5-dimethylhexane
**Slightly difficult to release
***A: Ethylene-butene-1 copolymer elastomer B: Styrene-butadiene copolymer elastomer

What we claim is:

1. An ethylene polymer composition for rotational molding consisting essentially of
   (a) an ethylene polymer containing at least 85% by weight of ethylene,
   (b) 5 to 50% of an elastomer based on the weight of (a),
   (c) a crosslinking agent of the formula:

$$R-O-O-\underset{R''}{\overset{R'}{\underset{|}{\overset{|}{C}}}}-(CH_2-CH_2)_n-\underset{R''}{\overset{R'}{\underset{|}{\overset{|}{C}}}}-O-O-R \quad (1)$$

or $$R-O-O-\underset{R''}{\overset{R'}{\underset{|}{\overset{|}{C}}}}-\!\!\left\langle\!\!\!\bigcirc\!\!\!\right\rangle\!\!-\underset{R''}{\overset{R'}{\underset{|}{\overset{|}{C}}}}-O-O-R \quad (2)$$

wherein n is 1 or 2, R is a tertiary alkyl group, and R' and R" each independently is an alkyl group, and
   (d) 50 to 500% based on the weight of (c) of at least one crosslinking aid selected from group consisting of 1,2-polybutadiene, triallyl cyanurate and triallyl isocyanurate.

2. An ethylene polymer composition according to claim 1 wherein the amount of the elastomer is in the range of from 5 to 30% based on the weight of the ethylene polymer.

3. An ethylene polymer composition according to claim 1 wherein the elastomer is at least one member selected from the group consisting of natural rubber (NR), styrene-butadiene rubber (SBR), butadiene rubber (BR), acrylonitrile-butadiene rubber (NBR), chloroprene rubber (CR), isoprene rubber (IR), isobutylene isoprene rubber (IIR), chlorinated polyethylene, styrene-butadiene block-copolymer, styrene-isoprene block-copolymer and an ethylene-olefin copolymer elastomer.

4. An ethylene polymer composition according to claim 1 wherein R is a tertiary alkyl group having 4 to 8 carbon atoms and each of R' and R" is an alkyl group having 1 to 8 carbon atoms.

5. An ethylene polymer composition according to claim 1 wherein the crosslinking agent is at least one compound selected from the group consisting of 2,5-bis(tert.-butylperoxy)-2,5-dimethylhexane and α,α'-bis(-tert.-butylperoxyisopropyl)benzene.

6. An ethylene polymer composition according to claim 1 or 2 wherein the crosslinking aid is 1,2-polybutadiene.

7. An ethylene polymer composition according to any one of claims 1, 2 and 3 wherein the elastomer is a copolymer derived from ethylene and an α-olefin having at least three carbon atoms.

8. An ethylene polymer composition according to claim 1 wherein the amount of the crosslinking agent is in the range of from 0.1 to 5 parts by weight based on 100 parts by weight of the ethylene polymer.

9. In a process for making a rotationally molded article, the improvement comprising rotationally molding the ethylene polymer composition according to claim 1.

* * * * *